H. L. BLOOD.
PLANER AND SYSTEM OF MOTOR CONTROL THEREFOR.
APPLICATION FILED JAN. 7, 1918.

1,397,396.

Patented Nov. 15, 1921.
3 SHEETS—SHEET 1.

INVENTOR
Harold L. Blood
BY S. Jay Teller
ATTORNEY

H. L. BLOOD.
PLANER AND SYSTEM OF MOTOR CONTROL THEREFOR.
APPLICATION FILED JAN. 7, 1918.

1,397,396.

Patented Nov. 15, 1921.
3 SHEETS—SHEET 3.

INVENTOR
Harold L. Blood
BY S. Jay Teller
ATTORNEY

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

PLANER AND SYSTEM OF MOTOR CONTROL THEREFOR.

1,397,396.  Specification of Letters Patent.  Patented Nov. 15, 1921.

Original application filed March 15, 1917, Serial No. 154,927. Divided and this application filed January 7, 1918. Serial No. 210,624.

*To all whom it may concern:*

Be it known that I, HAROLD L. BLOOD, a citizen of the United States, residing at Plainfield, in the county of Union and State of New Jersey, have invented certain new and useful Improvements in Planers and Systems of Motor Control Therefor, of which the following is a specification.

This application constitutes a division of my copending application Serial No. 154,927 for planers and systems of motor control therefor, filed March 15th, 1917. One of the objects of the present invention is to provide an apparatus of the type set forth in the said application having certain specific mechanical and electrical features which are advantageous under certain conditions of use. The objects of the invention will be more fully understood from the following specification and claims.

Figure 1:
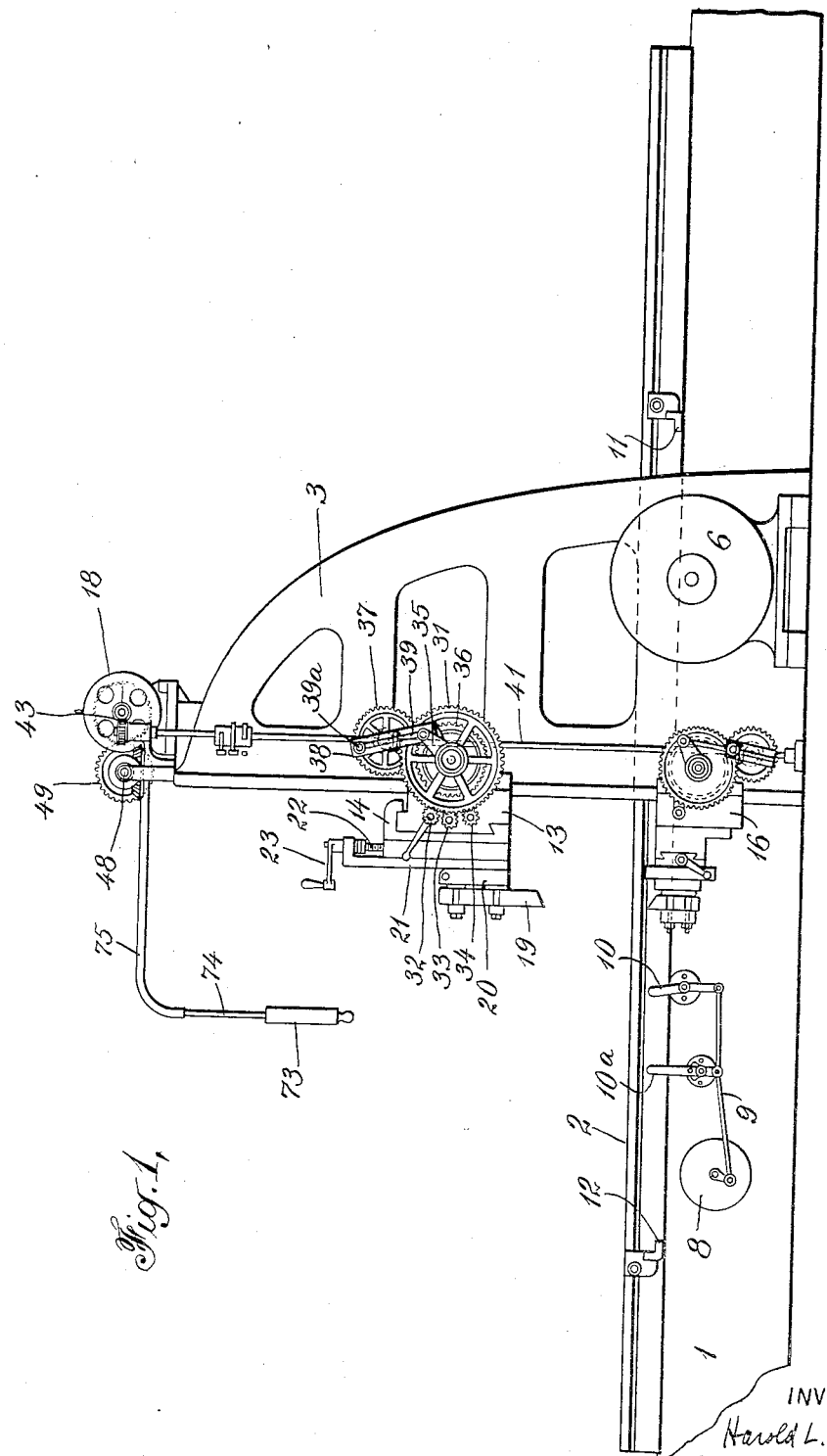
Figure 1 is a side elevation of a planer embodying the invention.
Figure 2:
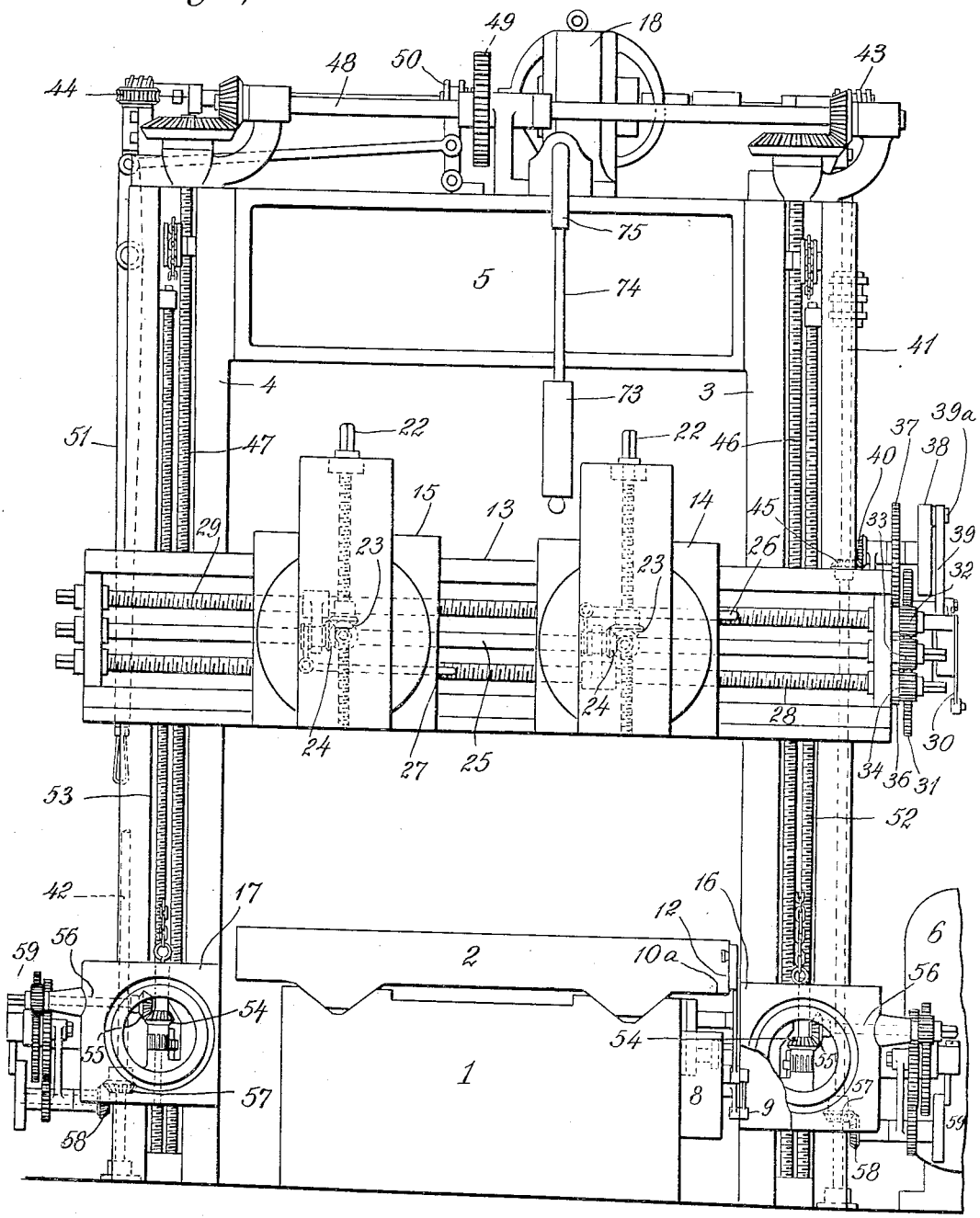
Fig. 2 is a front elevation.

Referring particularly to Figs. 1 and 2 of the drawings, 1 represents the planer bed, 2 the reciprocating table, 3 and 4 the uprights or housings and 5 the arch connecting the housings. For reciprocating the table 2 on its bed there is provided a reversing electric motor 6 which is connected with the table in any usual or preferred way, as for instance, by means of the gearing 7 diagrammatically illustrated in Fig. 3. For controlling the electric circuits in the manner to be herein described, there is provided a controlling or pilot switch 8. This switch is operated by means of a rod 9 connected to levers 10 and 10ᵃ which are engaged respectively by dogs 11 and 12 secured to the reciprocating table. These dogs are adjustable to regulate the length of the stroke.

Coöperating with the reciprocating table to act upon work carried thereby, there are one or more cutting tools carried by suitable heads. So far as the broader phases of my invention are concerned, the number of tool heads and the relative positions thereof are immaterial. I prefer, however, to provide four tool heads as shown in the drawings. In the construction illustrated there is a vertically movable cross rail 13 which is fitted to vertical guides on the uprights 3 and 4. Transversely movable along the cross rail 13 are one or more (in this case two) tool heads 14 and 15. Preferably also there are provided two side tool heads 16 and 17 which are vertically adjustable along the guides on the uprights 3 and 4. Suitable means is provided for effecting preliminary adjustment of the tools and for feeding them during operation of the planer. Preferably a supplemental electric motor 18 mounted on the arch 5 is provided for this purpose, though my present invention is not so limited.

For connecting the motor with the tool heads I prefer to use mechanism which, as aforesaid, is similar to that set forth in the Greenleaf & Keefer Patent 1,299,192, dated April 1st, 1919. It will be necessary herein to refer only to the essential features of this mechanism as reference can be had to the said patent for the several details.

In Fig. 1 one of the tools is indicated at 19, this being carried by a clapper and clapper box 20 secured to a slide 21 vertically movable on the saddle of the tool head 14. For the sake of clearness the tools and the clappers and clapper boxes have been omitted from the Fig. 2. For moving the slides 21 vertically with respect to their saddles, adjusting screws 22 are provided which can be operated manually if desired by means of a crank such as shown at 23. Splined upon each of these screws is a bevel gear 23 which is connected with a bevel gear 24 loosely mounted on a transverse shaft 25 rotatable in bearings on the cross rail 13. By means of clutch elements splined to the shaft 25 and controllable respectively by the hand levers 26 and 27, either of the gears 24 can be connected with the shaft 25 so that when the shaft 25 is rotated the corresponding screw 22 will be turned to raise or lower the corresponding slide 21 and the tool carried thereby.

Transverse threaded screws 28 and 29 are provided to respectively control the transverse movements of the tool heads 14 and 15, these screws being parallel to the shaft 25 and similarly mounted.

The shafts and screws 25, 28 and 29 can be moved manually when desired, as for instance, by means of a crank 30 as indicated in Fig. 2. In order that the shafts may be rotated by power, a spur gear 31 is mounted at one end of the cross rail in position to mesh with pinions 32, 33 and 34 detachably mounted respectively on the ends of the shafts 29, 25 and 28. Each of these pinions is preferably in the form of a "click box" having a reversible ratchet device which permits transmission of power from the pinions to the shafts in one direction only, and the construction is therefore such that by putting in place or removing the click boxes and by properly adjusting the ratchet devices thereof one or more of the shafts or screws can be intermittently moved in one direction when the gear 31 is oscillated, or can be continuously moved in the same direction when the gear 31 is continuously moved. For actuating the gear 31 there is provided a crank arm 35 at one side of the gear and a gear 36 at the other side thereof, both of these devices being loosely mounted. By means of a suitable clutch mechanism, either the crank 35 or the gear 36 can be connected with the gear 31. A gear 37 meshes with the gear 36 and a feed plate 38 is connected with the crank 35 by means of a connecting rod 39 and an adjustable pin 39ª the said gear and feed plate being connected together and driven by means of a bevel gear 40. Two vertical shafts 41 and 42 are mounted on the uprights 3 and 4 and are driven by the motor 18 through worm and wheel gearing at 43 and 44. Splined on the shaft 41 is a bevel gear 45 which meshes with the aforesaid bevel gear 40 and thus transmits power to rotate the gear 36 by means of the gear 37 and to oscillate the crank 35 by means of the feed plate 38 and the connected rod 39. It will be seen that if the motor be operated to rotate the feed plate 38 through a definite angle, as for instance through a whole revolution or a half revolution, and that if the gear 31 be connected with the crank 35, one or more of the shafts 25, 28 and 29 will be rotated in one direction or the other as required through a definite angle, thus moving one or the other or both of the tool heads to the right or to the left as required or moving one or the other or both of the slides 21 upward or downward as required. If the motor 18 be operated continuously in one direction or the other and if the gear 31 be connected with the gear 36, then either or both of the tool heads can be moved continuously in either direction as required or either or both of the slides 21 can be moved continuously in either direction as required.

For the purpose of adjusting the cross rail 13 vertically, two screws 46 and 47 are provided which are connected by means of suitable bevel gearing with a transverse shaft 48 connectible with the motor 18 by means of gearing 49 and a clutch 50 manually operable by means of a lever 51. It will be seen that by engaging the clutch 50 and starting the motor 18 in one direction or the other the cross rail 13 may be raised or lowered as required.

The side tool heads 16 and 17 can be provided with cross slides and other means of tool adjustment as required, such parts being shown in Fig. 1 but omitted in Fig. 2 for the sake of clearness. For controlling the vertical movement of the side heads vertical screws 52 and 53 are provided. Splined upon each of these screws is a nut rotated by a bevel gear 54 which meshes with a bevel gear 55 on a transverse shaft 56 carried by the corresponding tool head. By rotating this shaft 56 either manually or by power, the tool head may be raised or lowered. For applying power to the shaft 56 of each tool head there is provided a bevel gear 57 which is splined to the corresponding vertical shaft 41 or 42. Each gear 57 meshes with a gear 58 and the gear 58 drives a mechanism 59 which is similar to that already described for applying power to the shafts 25, 28 and 29. A repetition of the description is unnecessary, and it will be understood that when the motor is rotated through a definite angle either or both of the tool heads 16 and 17 can be raised or lowered as required through a definite distance, and that when the motor is rotated continuously either or both of the tool heads can be moved continuously upward or downward as required. It will be observed that the amount of movement of either side head can be adjusted independently of the amount of movement of the cross heads.

The devices for controlling the feed motor 18 can conveniently be similar to those set forth in my aforesaid copending application, and they need not here be described.

The main motor 6 receives its current from the generator 60, the armatures of the motor and the generator being connected in a circuit which is permanently closed during normal operation of the planer. The motor and the generator are provided respectively with fields 63 and 64 protected respectively by choke coils 65 and 66. The generator 60 is driven by a direct current motor 62 receiving current from the main positive and negative lead wires. Preferably a starting resistance 67 is connected in the circuit of the motor 62. The motor 62 has a shunt field 68 which is so connected that as the starting resistance is cut out of circuit with the armature it is cut into circuit with the field. If the voltage at the armature fail either because of the opening of the circuit at the starting resistance or because of the failure of the main line voltage the motor becomes a generator producing current so long as it continues to rotate under momentum. The advantage of this construction will be made more fully apparent hereinafter.

The field 63 of the motor 6 is connected with the negative lead by means of a wire 69 and with the positive lead by means of the wire 70, the adjustable resistance 71 and a wire 72, the field being continuously energized.

For controlling the operation of the motor 6 and the generator 60, use is made of the switch 8 which has been already referred to as being automatically operated by the planer table. When the switch is moved toward the right, as viewed in Fig. 3, connections are made for rotatation of the motor 6 in the cutting direction, and when the switch is moved toward the left connections are made for the rotation of the motor in the return direction. As shown, the switch is in its central neutral position.

Preferably I provide a supplemental manually operable switch by means of which the planer can be controlled for effecting preliminary adjustments and for other purposes. This switch is preferably a pendent switch 73 located at any convenient place and connected by means of a flexible cable 74. As shown, the switch is suspended from a pipe or bar 75 carried by the arch 5 of the planer. The switch 73 in its preferred form comprises a manually operable core 76 which is movable longitudinally and angularly. There is a connection from one side of the resistance 71 to a contact 77 of the switch 8 and a connection from the other side of the resistance to a contact 78. The switch is provided with a movable contact bar 79 which connects the contacts 77 and 78 when the switch is in its right-hand cutting position or in its central neutral position, thus short-circuiting the resistance 71 and providing a strong field for the motor. In this way the motor is made to rotate slowly on the cutting stroke.

One side of the field 64 is connected with a contact 80 of the switch 8 through relatively stationary contacts 81, 81 of the switch 73. Carried by the core 76 is a contact bar 82 which connects the contacts 81, 81 when the core is in its lower position and is turned at right angles to the position shown. The other side of the field 64 is connected with the contact 83 through contacts 84, 84. Carried by the core 76 is a contact ring 85 which connects the said contacts 84, 84 when the core is in its lower turned position. The contacts 87 and 88 of the switch 8 are connected with the positive lead through the wire 72, the connection to the contact 88 being through the adjustable resistance 89. The contacts 90 and 91 are connected with the negative lead by means of the wire 92, the connection being such that the starting resistance 67 is included in the circuit.

When the switch 8 is moved toward the right from the position shown, the contacts 80 and 88 are connected by a contact bar 93 and the contacts 83 and 91 are connected by a contact bar 94. Through the connections thus formed current is supplied to the generator field 64 in the proper direction for causing the motor 6 to rotate in the direction for cutting. When the switch is moved toward the left, the contacts 80 and 83 are connected respectively with the contacts 90 and 87 thus supplying current to the generator field in the proper direction for causing the motor to rotate in the return direction. The speed of the motor during the cutting stroke can be regulated by adjusting the resistance 89 and the speed during the return stroke can be regulated by adjusting the resistance 71.

The wires 72 and 92 are so connected that they will not be disconnected from the upper pole of the generator 62 when the motor circuit is opened at 67. This enables the motor 62 while rotating under momentum, to act as a generator as before stated, and supply current to energize the fields of the generator 60 and the motor 6. If these fields were to become deënergized suddenly, the planer table would drift under momentum and would continue past the point of normal reversal without any braking action taking place. For some classes of work, particularly when the tool is cutting in a recess or behind a boss or rib, such drift might be disastrous either to the work or to the machine or to both. With the fields connected in the way shown and described, the normal braking action and reversal will take place so long as the motor 62 continues in motion.

The switch 8 is provided with a stationary contact 95 which is connected with one side of the generator field through the aforesaid contacts 81, 81, and the switch is also provided with a stationary contact 96 which is connected with one pole of the generator. The other pole of the generator is connected directly with the other end of the field, preferably through the resistance 97. The switch 8 has a movable contact bar 98 which connects the two contacts 95 and 96 when the switch is in neutral position. The connections are such that the current in the motor generator circuit is made to flow through the field coil 64 in the reversed direction, thus overcoming substantially all of the residual magnetism. During normal operation of the planer the reversed current flows only instantaneously while the switch is moving past the neutral position. When the planer is stopped the connection is maintained, thus preventing the generator from producing such a current as would cause creeping of the motor and of the planer table.

When the planer is in normal operation the core 76 of the switch 73 is in its lower position.

Figure 3:
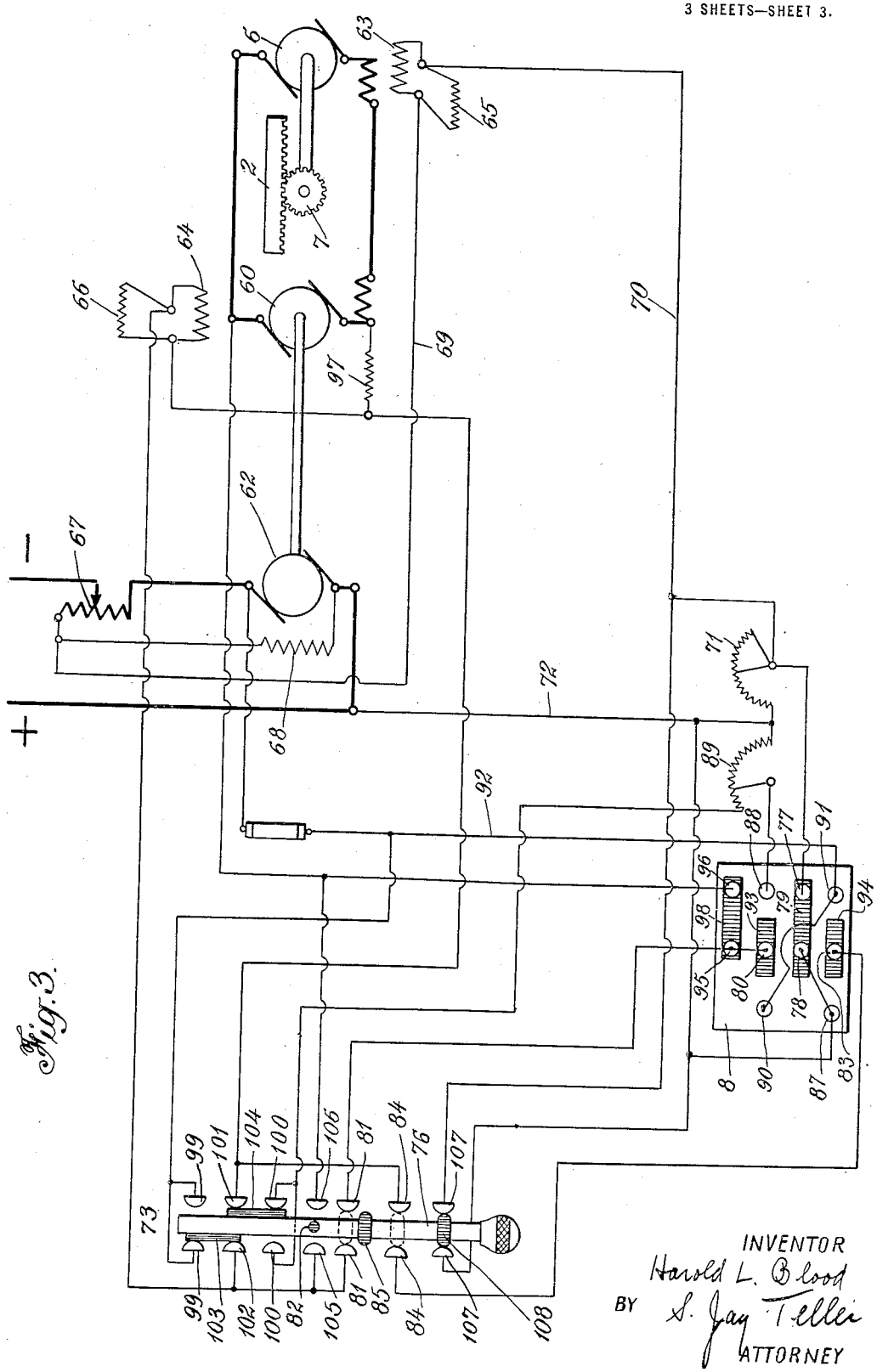
Fig. 3 is a diagram of electrical connections.

When the planer is to be controlled manually by means of the switch 73 the core 74 is moved upward to the level shown in Fig. 3. This upward movement disconnects the contacts 81, 81 and the contacts 84, 84, thus entirely disconnecting the automatic switch 8 and rendering it inoperative.

The switch 73 is provided with contacts 99, 99 connected to the negative main and with contacts 100, 100 connected to the positive main through the resistance 89. There are also contacts 101 and 102 connected respectively to the two sides of the generator field 64. Connected with the core 76 are contact bars 103 and 104 adapted to connect the contacts 99—102. When the switch is turned to one position as shown in Fig. 3, the contact 101 is connected with the corresponding contact 100 and the contact 102 is connected with the corresponding contact 99. In this way the generator field is energized for causing rotation of the motor in one direction. When motion of the motor in the other direction is desired, the switch is moved to connect the contact 101 with the corresponding contact 99 and to connect the contact 102 with the corresponding contact 100.

The switch is provided with two opposite contacts 105 and 106 which are adapted to be connected by the aforesaid bar 82 when the switch is in its central neutral position. The connecting of these two contacts completes a circuit through the generator field from the poles of the generator, thus supplying a reversed current to overcome residual magnetism. Inasmuch as the normal circuit for the generator field has been broken at both sides by means of the switch 73, the field is entirely disconnected from the main leads and these therefore can not effect the potential at which the field is maintained.

Preferably, in order that the motor 6 may rotate slowing when under the control of the supplemental manually operable switch, the resistance 71 is short-circuited, thus giving the motor field its maximum strength. The switch 73 is provided with two contacts 107, 107 which are connected by the contact ring 108 when the supplemental switch is in its upper operative position as shown.

What I claim is:

1. The combination of a reversing electric motor, a reciprocating table connected to the motor to be driven thereby, a generator having its armature connected in closed circuit with the motor armature, a switch controlled automatically by the table for successively reversing the field circuit of the generator to change the polarity thereof thus successively reversing the motor and causing it to drive the table successively in opposite directions, a manually operable switch supplemental to the table operated switch for controlling and reversing the field circuit of the generator, the said switch when in operative position serving to render the table operated switch inoperative, connections for supplying a supplemental reversed current to the generator field, contacts on the table operated switch for momentarily closing the reversed current connections when the switch is moved to reverse the generator field circuit, and means operable by the manually operable switch for closing the reversed circuit connections when the normal field circuit is opened and for opening the connections when the circuit is closed.

2. In a planer or other machine having a reciprocating table and an adjustable tool, the combination with the table and the tool, of a reversing electric motor connected to the table, a generator having its armature connected in closed circuit with the motor armature, an automatic table operated switch for successively reversing the field circuit of the generator to change the polarity and thereby successively reverse the said motor, a manually operable switch supplemental to the table operated switch for controlling and reversing the generator field and thus controlling and reversing the motor, and two circuit connections between the automatic switch and the generator field extending through the supplemental switch and arranged to be broken when the supplemental switch is operated, thus completely disconnecting the automatic switch from the generator field.

3. The combination of a reciprocating table, a reversing electric motor connected with the table, a resistance in circuit with the motor field, an automatic table actuated switch normally serving to successively reverse the motor and cause it to drive the table successively in opposite directions, a manually operable switch supplemental to the table actuated switch for controlling and reversing the motor, and a circuit extending through the supplemental switch and serving to short-circuit the motor field resistance upon movement of the supplemental switch to an operative position.

In testimony whereof, I hereto affix my signature.

HAROLD L. BLOOD.